United States Patent
Lu et al.

(10) Patent No.: US 9,952,783 B2
(45) Date of Patent: Apr. 24, 2018

(54) DATA PROCESSING METHOD AND APPARATUS, AND SHARED STORAGE DEVICE

(71) Applicant: Huawei Technologies Co., Ltd., Shenzhen (CN)

(72) Inventors: Cheng Lu, Chengdu (CN); Bin Yang, Chengdu (CN); Ye Zou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 14/599,673

(22) Filed: Jan. 19, 2015

(65) Prior Publication Data

US 2015/0143065 A1   May 21, 2015

Related U.S. Application Data

(63) Continuation of application No. PCT/CN2013/074993, filed on Apr. 28, 2013.

(30) Foreign Application Priority Data

Jul. 17, 2012   (CN) .......................... 2012 1 0246856

(51) Int. Cl.
*G06F 3/06* (2006.01)
*G06F 11/14* (2006.01)
*G06F 17/30* (2006.01)

(52) U.S. Cl.
CPC ............ *G06F 3/0619* (2013.01); *G06F 3/061* (2013.01); *G06F 3/065* (2013.01); *G06F 3/0674* (2013.01);
(Continued)

(58) Field of Classification Search
CPC ........ G06F 3/061; G06F 3/065; G06F 3/0683; G06F 11/14; G06F 3/0674; G06F 17/30634; G06F 3/0619
See application file for complete search history.

(56) References Cited

U.S. PATENT DOCUMENTS 6,434,681 B1   8/2002 Armangau
7,373,366 B1   5/2008 Chatterjee et al.
(Continued)

FOREIGN PATENT DOCUMENTS

| CN | 101063951 A | 10/2007 |
|----|-------------|---------|
| CN | 101329642 A | 12/2008 |
| CN | 101937378 A | 1/2011 |
| CN | 102521269 A | 6/2012 |

OTHER PUBLICATIONS

Foreign Communication From a Counterpart Application, European Application No. 13820178.5, Extended European Search Report dated Jun. 11, 2015, 9 pages.
(Continued)

*Primary Examiner* — David X Yi
*Assistant Examiner* — Zubair Ahmed
(74) *Attorney, Agent, or Firm* — Conley Rose, P.C.

(57) ABSTRACT

A data processing method and apparatus, and a shared storage device, where the method includes receiving, by a shared storage device, a copy-on-write request sent by another storage device, where the copy-on-write request includes data on which copy-on-write is to be performed and a logical unit identifier and snapshot time point of the data; storing the data; and searching, according to the logical unit identifier and snapshot time point of the data, a preset shared mapping table for a corresponding entry, and storing, in the corresponding entry, mapping entry information of the data, where the mapping entry information includes the logical unit identifier and snapshot time point of the data and a storage address that is of the data and in the shared storage device, which can improve efficiency of snapshot data processing.

21 Claims, 9 Drawing Sheets

(52) U.S. Cl.
CPC ............ *G06F 3/0683* (2013.01); *G06F 11/14* (2013.01); *G06F 17/30634* (2013.01)

(56) References Cited

U.S. PATENT DOCUMENTS

| | | |
|---|---|---|
| 8,082,407 B1 | 12/2011 | Chatterjee et al. |
| 2004/0158566 A1 | 8/2004 | Chong, Jr. et al. |
| 2004/0186900 A1 | 9/2004 | Nakano et al. |
| 2007/0271431 A1* | 11/2007 | Hwang ............... G06F 11/1471 711/162 |
| 2007/0288711 A1 | 12/2007 | Chen et al. |
| 2008/0114951 A1* | 5/2008 | Lee .................... G06F 11/1469 711/162 |

OTHER PUBLICATIONS

Partial English Translation and Abstract of Chinese Patent Application No. CN101063951A, dated Mar. 26, 2015, 34 pages.
Partial English Translation and Abstract of Chinese Patent Application No. CN101329642A, dated Mar. 13, 2015, 4 pages.
Partial English Translation and Abstract of Chinese Patent Application No. CN102521269A, dated Mar. 17, 2015, 4 pages.
Foreign Communication From a Counterpart Application, PCT Application No. PCT/CN2013/074993, English Translation of International Search Report dated Jul. 18, 2013, 2 pages.
Foreign Communication From a Counterpart Application, PCT Application No. PCT/CN2013/074993, English Translation of Written Opinion dated Jul. 18, 2013, 10 pages.

* cited by examiner

|              | T0 | T1 | T2 | T3 | T4 |
|--------------|----|----|----|----|----|
| Logical unit 0 |    |    |    |    |    |
| Logical unit 1 |    |    |    |    |    |
| Logical unit 2 |    |    |    |    |    |
| Logical unit 3 |    |    |    |    |    |
| ...          |    |    | ...|    |    |
| Logical unit n |    |    |    |    |    |

FIG. 2

DATA PROCESSING METHOD AND APPARATUS, AND SHARED STORAGE DEVICE

CROSS-REFERENCE TO RELATED APPLICATION

This application is a continuation of International Application No. PCT/CN2013/074993, filed on Apr. 28, 2013, which claims priority to Chinese Patent Application No. 201210246856.8, filed on Jul. 17, 2012, both of which are incorporated herein by reference in their entireties.

TECHNICAL FIELD

The present invention relates to the field of data storage technologies, and in particular, to a data processing method and apparatus, and a shared storage device.

BACKGROUND

With a higher demand on storage applications, users need to perform data protection in an online manner, and a snapshot is one of the effective methods for preventing a data loss using an online storage device. The snapshot refers to an instant consistency image of data of a production volume. The so-called production volume refers to a logical unit data volume that provides data storage and access space for basic service applications. By using the data snapshot technology, an instant consistency image (namely, a snapshot) that is of data of a production volume and completely available may be obtained in an instant, and occupies relatively less storage space. After a snapshot is created, the snapshot and a production volume may be simultaneously accessed, thereby not affecting service continuity of the production volume.

In an existing snapshot data processing method, when data of a logical unit in a production volume is written, copy-on-write and mapping entry insertion need to be performed on the data of the same logical unit for each snapshot in the same production volume. Assuming that one production volume has multiple activated snapshots, copy-on-write and mapping entry insertion need to be performed for multiple times on data of a same logical unit for the multiple snapshots of the same production volume.

Therefore, the existing snapshot data processing method has a problem of low efficiency.

SUMMARY

Embodiments of the present invention provide a data processing method and apparatus, and a shared storage device, which can improve efficiency of snapshot data processing.

According to a first aspect, an embodiment of the present invention provides a data processing method, including receiving, by a shared storage device, a copy-on-write request sent by another storage device, where the copy-on-write request includes data on which copy-on-write is to be performed and a logical unit identifier and snapshot time point of the data; storing the data; and searching, according to the logical unit identifier and snapshot time point of the data, a preset shared mapping table for a corresponding entry, and storing, in the corresponding entry, mapping entry information of the data, where the mapping entry information includes the logical unit identifier and snapshot time point of the data and a storage address that is of the data and in the shared storage device.

In a first possible implementation manner, a representation form of the shared mapping table includes a shared tree, where the shared tree includes at least one parent node and at least one leaf node, a parent node of the shared tree includes a logical unit identifier of data on which copy-on-write is to be performed, and a leaf node of the shared tree includes mapping entry information of data on which the copy-on-write has been performed; when a same parent node includes multiple leaf nodes, the multiple leaf nodes are arranged in the same parent node in ascending order according to snapshot time points included in corresponding mapping entry information; and the searching, according to the logical unit identifier and snapshot time point of the data, a preset shared mapping table for a corresponding entry, and storing, in the corresponding entry, mapping entry information of the data may be implemented as follows: querying the shared tree according to the logical unit identifier of the data; determining a parent node corresponding to the logical unit identifier; determining, according to the logical unit identifier and snapshot time point of the data and in the determined parent node, a leaf node corresponding to the logical unit identifier and the snapshot time point; and storing, in the corresponding leaf node, the mapping entry information of the data.

With reference to the first aspect or the first possible implementation manner of the first aspect, in a second possible implementation manner, the method further includes receiving a read request, where the read request includes a logical unit identifier and snapshot time point of to-be-read data; querying the shared mapping table, and determining whether mapping entry information matching the logical unit identifier and snapshot time point of the to-be-read data exists in the shared mapping table; and when the mapping entry information matching the logical unit identifier and snapshot time point of the to-be-read data exists in the shared mapping table, reading data from the shared storage device according to a storage address included in the matching mapping entry information.

With reference to the second possible implementation manner of the first aspect or the first possible implementation manner of the first aspect, in a third possible implementation manner, the method further includes, when the mapping entry information matching the logical unit identifier and snapshot time point of the to-be-read data does not exist in the shared mapping table, determining whether other mapping entry information corresponding to the logical unit identifier of the to-be-read data exists in the shared mapping table; when the other mapping entry information corresponding to the logical unit identifier of the to-be-read data exists in the shared mapping table, determining whether mapping entry information with a snapshot time point greater than the snapshot time point of the to-be-read data exists in the other mapping entry information; when the mapping entry information with a snapshot time point greater than the snapshot time point of the to-be-read data exists in the other mapping entry information, determining mapping entry information, which is corresponding to the first snapshot time point greater than the snapshot time point of the to-be-read data and in the other mapping entry information, as mapping entry information of the to-be-read data; and reading data from the shared storage device according to a storage address included in the mapping entry information of the to-be-read data.

According to a second aspect, an embodiment of the present invention provides a data processing apparatus, including a receiving module configured to receive a copy-on-write request sent by another storage device, where the copy-on-write request includes data on which copy-on-write is to be performed and a logical unit identifier and snapshot time point of the data; a storage module configured to store the data; and a processing module configured to search, according to the logical unit identifier and snapshot time point of the data, a preset shared mapping table for a corresponding entry, and store, in the corresponding entry, mapping entry information of the data, where the mapping entry information includes the logical unit identifier and snapshot time point of the data and a storage address that is of the data and in a shared storage device.

With reference to the second aspect, in a first possible implementation manner, a representation form of the shared mapping table includes a shared tree, where the shared tree includes at least one parent node and at least one leaf node, a parent node of the shared tree includes a logical unit identifier of data on which copy-on-write is to be performed, and a leaf node of the shared tree includes mapping entry information of data on which the copy-on-write has been performed; when a same parent node includes multiple leaf nodes, the multiple leaf nodes are arranged in the same parent node in ascending order according to snapshot time points included in corresponding mapping entry information; and the processing module is configured to query the shared tree according to the logical unit identifier of the data; determine a parent node corresponding to the logical unit identifier; determine, according to the logical unit identifier and snapshot time point of the data and in the determined parent node, a leaf node corresponding to the logical unit identifier and the snapshot time point; and store, in the corresponding leaf node, the mapping entry information of the data.

With reference to the second aspect or the first possible implementation manner of the second aspect, in a second possible implementation manner, the receiving module is further configured to receive a read request, where the read request includes a logical unit identifier and snapshot time point of to-be-read data; and the data processing apparatus further includes a first judging module configured to query the shared mapping table according to the read request received by the receiving module, and determine whether mapping entry information matching the logical unit identifier and snapshot time point of the to-be-read data exists in the shared mapping table; and a reading module configured to, when the first judging module determines that the mapping entry information matching the logical unit identifier and snapshot time point of the to-be-read data exists in the shared mapping table, read data from the shared storage device according to a storage address included in the matching mapping entry information.

According to a third aspect, an embodiment of the present invention provides a shared storage device, including the foregoing data processing apparatus.

In the embodiments of the present invention, data is stored in a shared storage device according to the data on which copy-on-write is to be performed and that is included in a received copy-on-write request, a logical unit identifier and snapshot time point of the data and a storage address that is of the data and in the shared storage device are used as mapping entry information of the data according to the logical unit identifier and snapshot time point of the data that are included in the copy-on-write request, and the mapping entry information of the data is stored in a shared mapping table, so that all activated snapshots that are of each production volume and related to a same logical unit may share a same copy of copy-on-write data and corresponding mapping entry information, thereby reducing the number of copy-on-write times and improving efficiency of snapshot data processing.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

FIG. 2 is a schematic diagram of a shared mapping table applied to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
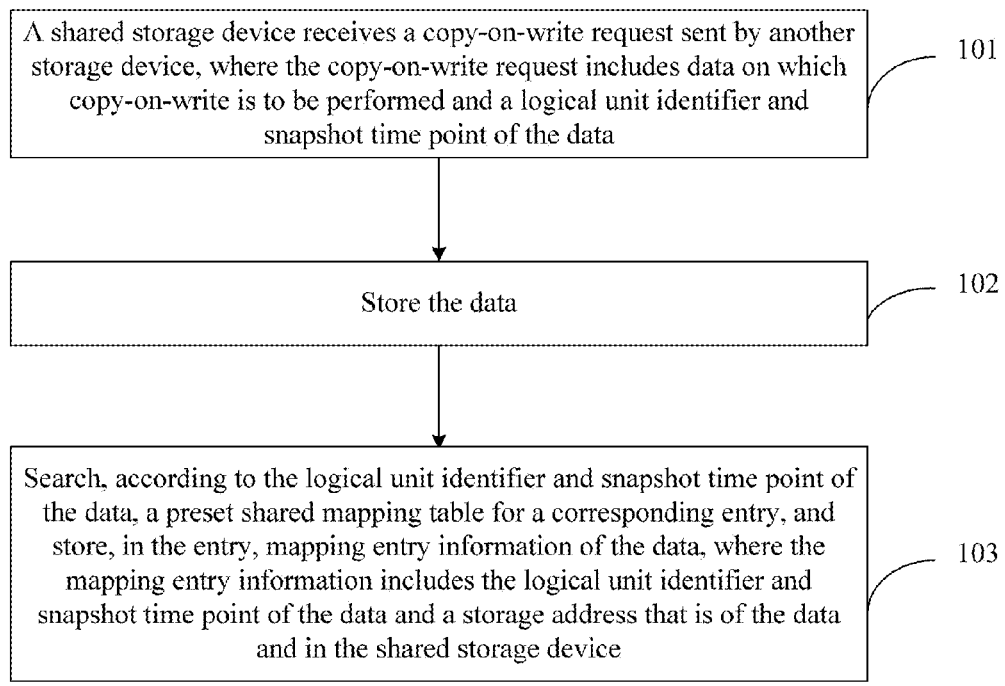
FIG. 1 is a schematic flowchart of a data processing method according to an embodiment of the present invention.

FIG. 1 is a schematic flowchart of a data processing method according to an embodiment of the present invention. As shown in FIG. 1, the method includes the following steps.

101: A shared storage device receives a copy-on-write request sent by another storage device, where the copy-onwrite request includes data on which copy-on-write is to be performed and a logical unit identifier and snapshot time point of the data.

For example, a production volume is stored in the other storage device, where one production volume includes multiple logical units, and each logical unit corresponds to one logical unit identifier.

In one optional implementation manner of this embodiment, a sequence number of each logical unit is used as a logical unit identifier corresponding to each logical unit. For example, a logical unit identifier of a first logical unit is 1, a logical unit identifier of a second logical unit is 2, and so on.

In one optional implementation manner of this embodiment, if one production volume includes multiple snapshots, a corresponding snapshot time point is sequentially allocated to each of the snapshots according to a sequence of activated snapshots, that is, snapshot time points refer to sequence numbers indicating a sequence in which snapshots are activated. For example, when multiple snapshots are shot at continuous time points for a same production volume, a snapshot time point corresponding to a snapshot activated for the first time is 0, a snapshot time point corresponding to a snapshot activated for the second time is 1, and so on.

In one optional implementation manner of this embodiment, the other storage device may receive a write request, where the write request may be sent by any network entity that needs to write data into a production volume on the other storage device, the write request includes at least one logical unit identifier, and the logical unit identifier indicates a logical unit into which new data needs to be written. For example, if data needs to be written into a logical unit in a production volume, a write request may include a logical unit identifier of the logical unit.

When new data is written into the logical unit corresponding to the logical unit identifier, currently stored data (the data on which the copy-on-write is to be performed) in the logical unit needs to be first copied to the shared storage device, so that the data stored in the shared storage device may be used to perform data recovery when a problem such as a storage error occurs subsequently. Therefore, the other storage device may send the copy-on-write request to the shared storage device.

102: Store the data.

It should be noted that, in this embodiment, all data on which the copy-on-write needs to be performed and that are generated by a same production volume may be stored in the shared storage device, so that a storage resource and a memory resource of the other storage device are not occupied, thereby ensuring running of a data service in the other storage device. Certainly, the data may also be stored in the other storage device, which is not limited herein. In this embodiment of the present invention, that data is stored in the shared storage device is used as an example for description.

103: Search, according to the logical unit identifier and snapshot time point of the data, a preset shared mapping table for a corresponding entry, and store, in the entry, mapping entry information of the data, where the mapping entry information includes the logical unit identifier and snapshot time point of the data and a storage address that is of the data and in the shared storage device.

To improve efficiency of traversing a shared mapping table, in one optional implementation manner of this embodiment, a shared mapping table may be preset in the shared storage device, where the shared mapping table is used to store mapping entry information corresponding to data on which copy-on-write needs to be performed and that is generated by a same production volume. It may be understood that, in the shared mapping table, mapping entry information with a same logical unit identifier may be arranged in ascending order according to snapshot time points. FIG. 2 is a schematic diagram of a shared mapping table applied to an embodiment of the present invention. As shown in FIG. 2, vertical coordinates of the shared mapping table indicate logical unit identifiers of data on which copy-on-write is to be performed, and the logical unit identifiers may be arranged in ascending order according to sequence numbers of the logical unit identifiers; horizontal coordinates indicate snapshot time points of data, and the snapshot time points may be arranged in ascending order. For example, T0, T1, T2, T3 and T4 indicate snapshot time points 0, 1, 2, 3 and 4, and a logical unit 0 indicates that a logical unit identifier is 0, and so on.

In this embodiment, the storage address of the data and the logical unit identifier and snapshot time point of the data may be set as the mapping entry information of the data, and the mapping entry information of the data is stored in the preset shared mapping entry. The corresponding entry may be searched for in the preset shared mapping table according to the logical unit identifier and snapshot time point of the data, and the mapping entry information of the data is stored in the entry. The storage address of the data is a storage address at which the data is stored in the shared storage device, the logical unit identifier of the data is an identifier of a logical unit in which the data is stored in the other storage device before the copy-on-write is performed, and the snapshot time point is a snapshot time point of the copy-on-write on the data.

It should be noted that, in this embodiment, a shared mapping table may be preset in the shared storage device, so that the shared mapping table does not occupy a storage resource or a memory resource of the other storage device, and when mapping entry information in the shared mapping table is queried, the shared mapping table also does not occupy a processor resource or a memory resource of the other storage device, thereby ensuring running of a data service in the other storage device.

Figure 3:
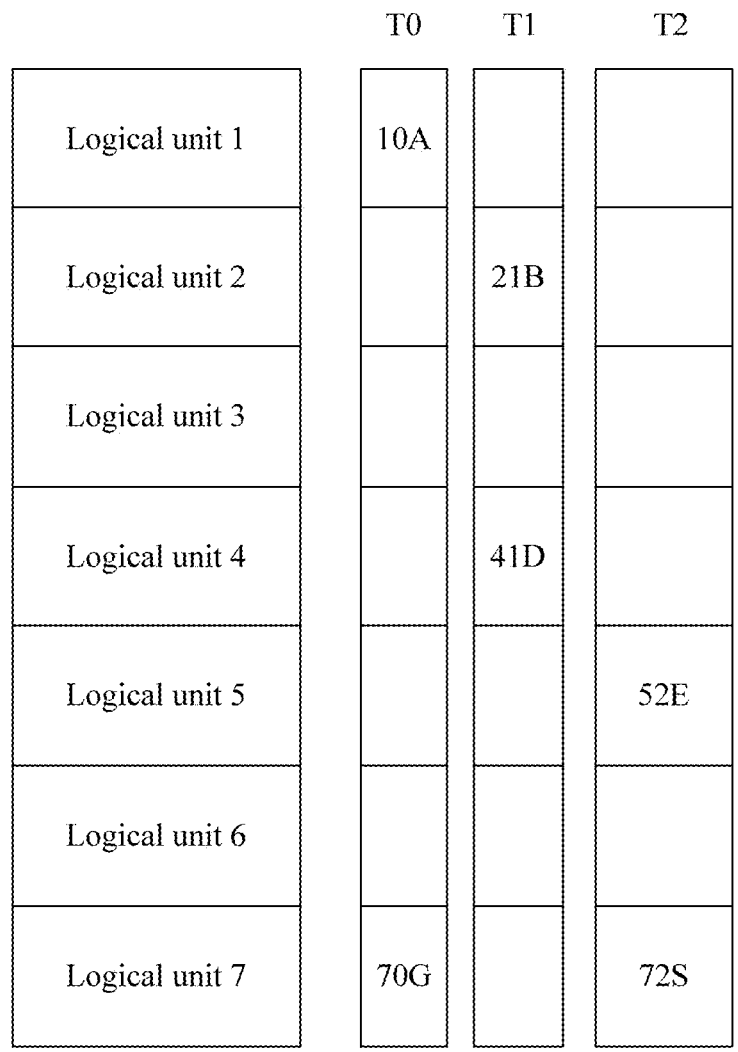
FIG. 3 is a schematic diagram of one specific implementation form of the shared mapping table shown in FIG. 2.

In one optional implementation manner of this embodiment, FIG. 3 is a schematic diagram of one specific implementation form of the shared mapping table shown in FIG. 2. As shown in FIG. 3, three snapshots are successively created for a same production volume.

Data updates for a logical unit 1 and a logical unit 7 are performed after a snapshot time point 0 (in FIG. 3, T0 indicates the snapshot time point 0), that is, copy-on-write is performed on data in the logical unit 1 and the logical unit 7 at the snapshot time point 0. Therefore, mapping entry information of the data in the logical unit 1 is 10A in the shared mapping table, where 1 is a logical unit identifier of the logical unit 1, 0 is a snapshot time point, A is a storage address at which the data in the logical unit 1 at the snapshot time point 0 is stored in the shared storage device when the copy-on-write is performed, and the mapping entry information 10A is stored in an entry corresponding to 10 in the shared mapping table; mapping entry information of the data in the logical unit 7 is 70G in the shared mapping table, where 7 is a logical unit identifier of the logical unit 7, 0 is a snapshot time point, G is a storage address at which the data in the logical unit 7 at the snapshot time point 0 is stored in the shared storage device when the copy-on-write is performed, and the mapping entry information 70G is stored in an entry corresponding to 70 in the shared mapping table.

Data updates for a logical unit 2 and a logical unit 4 are performed after a snapshot time point 1 (T1), that is, copy-on-write is performed on data in the logical unit 2 and the logical unit 4 at the snapshot time point 1. Therefore, mapping entry information of the data in the logical unit 2 is 21B in the shared mapping table, where 2 is a logical unit identifier of the logical unit 2, 1 is a snapshot time point, B is a storage address at which the data in the logical unit 2 at the snapshot time point 1 is stored in the shared storage device when the copy-on-write is performed, and the mapping entry information 21B is stored in an entry corresponding to 21 in the shared mapping table; mapping entry information of the data in the logical unit 4 is 41D in the shared mapping table, where 4 is a logical unit identifier of the logical unit 4, 1 is a snapshot time point, D is a storage address at which the data in the logical unit 4 at the snapshot time point 1 is stored in the shared storage device when the copy-on-write is performed, and the mapping entry information 41D is stored in an entry corresponding to 41 in the shared mapping table.

A data update for a logical unit 5 is performed after a snapshot time point 2, that is, copy-on-write is performed on data in the logical unit 5 at the snapshot time point 2. Therefore, mapping entry information of the data in the logical unit 5 is 52E in the shared mapping table, where 5 is a logical unit identifier of the logical unit 5, 2 is a snapshot time point, E is a storage address at which the data in the logical unit 5 at the snapshot time point 2 is stored in the shared storage device when the copy-on-write is performed, and the mapping entry information 52E is stored in an entry corresponding to 52 in the shared mapping table.

It should be noted that, after the snapshot time point 0, new data is written into the logical unit 7. As a result, before the snapshot time point 2, currently stored data (data on which copy-on-write needs to be performed) in the logical unit 7 is the new data that is written into the logical unit 7 after the snapshot time point 0. At the snapshot time point 2, mapping entry information corresponding to copy-on-write data in the logical unit 7 is 72S, where 7 is a logical unit identifier of the logical unit 7, 2 is a snapshot time point, S is a storage address at which the data in the logical unit 7 at the snapshot time point 2 is stored in the shared storage device when the copy-on-write is performed, and the mapping entry information 72S is stored in an entry corresponding to 72 in the shared mapping table.

In the shared mapping table shown in FIG. 3, at the snapshot time point 0, the copy-on-write is performed only on the data in the logical unit 1 and the logical unit 7; at the snapshot time point 1, the copy-on-write is performed only on the data in the logical unit 2 and the logical unit 4. Therefore, the data in the logical unit 1 at the snapshot time point 1 is the same as copy-on-write data of the logical unit 1 at the snapshot time point 0, the data in the logical unit 7 at the snapshot time point 1 is the same as copy-on-write data of the logical unit 7 at the snapshot time point 0, and the copy-on-write does not need to be performed again on the data in the logical unit 1 and the logical unit 7 at the snapshot time point 1. Therefore, all activated snapshots that are of each production volume and related to a same logical unit may share a same copy of copy-on-write data and corresponding mapping entry information, thereby reducing the number of copy-on-write times and improving efficiency of snapshot data processing. In addition, only data that is different between copy-on-write data corresponding to a previous snapshot time point and copy-on-write data corresponding to a current snapshot time point is stored in copy-on-write data corresponding to each snapshot time point, thereby improving a copying speed and saving storage space.

In one optional implementation manner of this embodiment, the shared mapping table in this embodiment may be implemented in a form of a shared tree, for example, a B+ tree. It should be noted that a logical unit identifier and a snapshot time point that are included in each piece of mapping entry information may be set as key value information of corresponding mapping entry information, so that a leaf node in the B+ tree is searched for according to the key value information.

Figure 4:
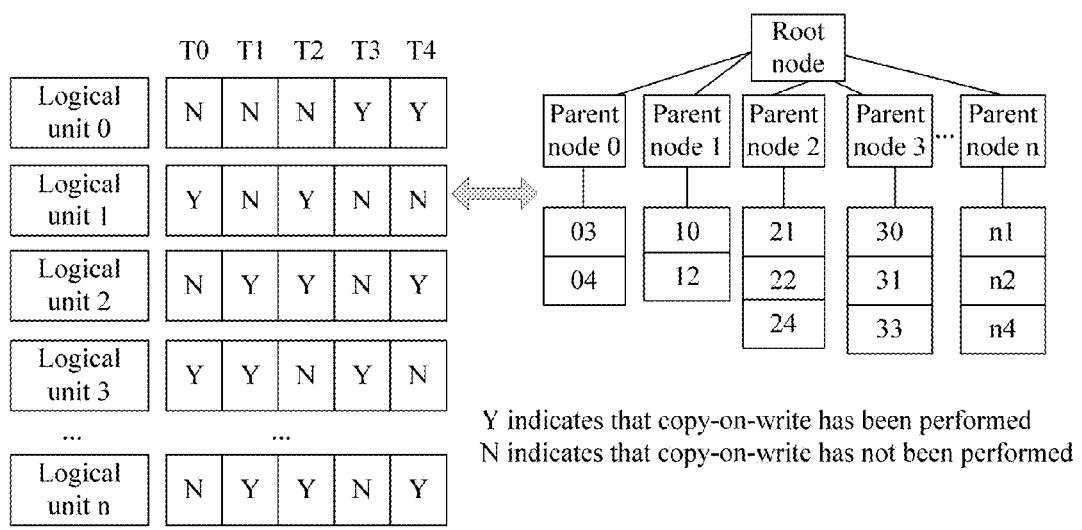
FIG. 4 is a schematic diagram of another specific implementation form of the shared mapping table shown in FIG. 2.

FIG. 4 is a schematic diagram of another specific implementation form of the shared mapping table shown in FIG. 2. The shared tree includes one root node, where the root node includes at least one parent node, each parent node corresponds to one logical unit, and each parent node includes a logical unit identifier of data on which copy-on-write is to be performed; and a parent node may include at least one leaf node, and each leaf node includes mapping entry information of data on which the copy-on-write has been performed. According to the shared tree shown in FIG. 4, the searching, according to the logical unit identifier and snapshot time point of the data, a preset shared mapping table for a corresponding entry, and storing, in the entry, mapping entry information of the data may be implemented as follows: querying a corresponding leaf node in the shared tree according to key value information that is formed by the logical unit identifier and snapshot time point of the data; and storing, in the queried leaf node, the mapping entry information of the data.

To accelerate query of mapping entry information, when a same parent node includes multiple leaf nodes, arrangement order of the leaf nodes in the parent node is ascending order according to snapshot time points included in mapping entry information corresponding to the leaf nodes. As shown in FIG. 4, in this embodiment of the present invention, a shared mapping table in a form of a B+ tree is used. In this embodiment, if copy-on-write is performed on the logical unit 0 separately at the snapshot time point 3 and the snapshot time point 4, a parent node 0 includes a leaf node 03 and a leaf node 04, that is, the leaf node 03 and the leaf node 04 separately store corresponding mapping entry information. To improve searching efficiency, a leaf node corresponding to key value information 03 may be arranged before a leaf node corresponding to key value information 04, that is, leaf nodes are arranged in ascending order according to the snapshot time points.

Certainly, a person skilled in the art may also understand that, in a specific implementation manner, if the mapping entry information is stored in a form of another shared tree, arrangement may also be made in descending order according to the snapshot time points, as long as a purpose of improving efficiency of searching for the mapping entry information is achieved, which is not limited herein.

In this embodiment of the present invention, according to data on which copy-on-write is to be performed and that is included in a received copy-on-write request, and a logical unit identifier and snapshot time point of the data, the data is stored in a shared storage device, the logical unit identifier and snapshot time point of the data and a storage address that is of the data and in the shared storage device are used as mapping entry information of the data, and the mapping entry information of the data is stored in a shared mapping table, so that all activated snapshots that are of each production volume and related to a same logical unit may share a same copy of copy-on-write data and corresponding mapping entry information, thereby reducing the number of copy-on-write times and improving efficiency of snapshot data processing.

In this embodiment of the present invention, only data that is different between copy-on-write data corresponding to a previous snapshot time point and copy-on-write data corresponding to a current snapshot time point is stored in copy-on-write data corresponding to each snapshot time point. Therefore, a speed for generating a snapshot is relatively fast, and storage space is also saved.

In this embodiment, the shared mapping table is stored in the shared storage device, so that a storage resource and a memory resource of the other storage device are not occupied, thereby ensuring running of a data service in the other storage device.

Figure 5:
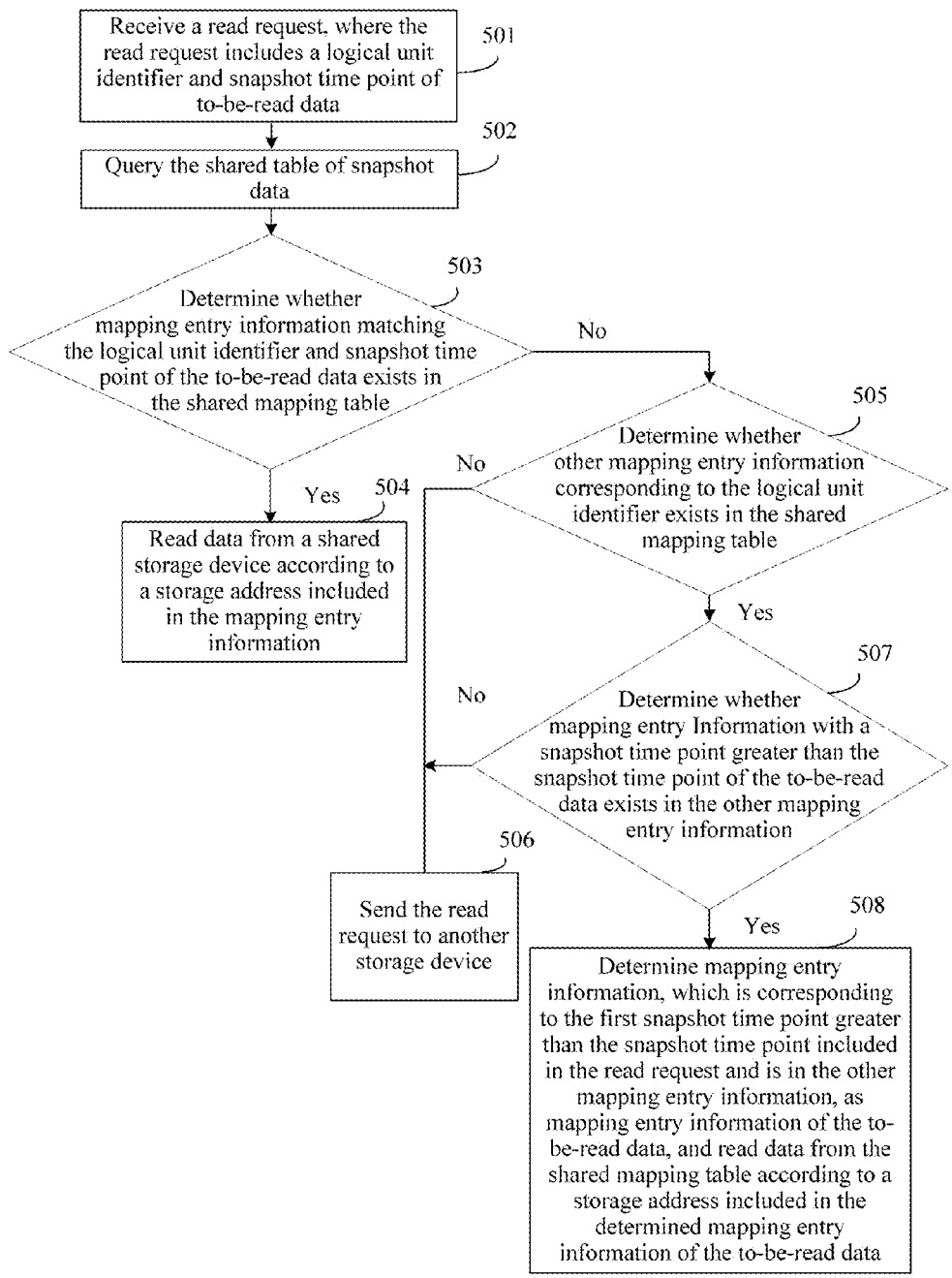
FIG. 5 is a schematic flowchart of a data processing method according to another embodiment of the present invention.

FIG. 5 is a schematic flowchart of a data processing method according to another embodiment of the present invention. As shown in FIG. 5, the method includes the following steps.

501: Receive a read request, where the read request includes a logical unit identifier and snapshot time point of to-be-read data.

For example, any network entity that needs to read data from a shared mapping table on a shared storage device may send a read request to the shared storage device.

It should be noted that the read request includes at least one logical unit identifier and snapshot time point of the to-be-read data.

502: Query a shared mapping table.

The shared mapping table in this embodiment is the shared mapping table described in the foregoing embodiment. For detailed content, reference is made to related description in the embodiment shown in FIG. 1, and details are not repeatedly described herein.

503: Determine whether mapping entry information matching the logical unit identifier and snapshot time point of the to-be-read data exists in the shared mapping table. If yes, execute step 504; if no, execute step 505.

In one optional implementation manner of this embodiment, if the shared mapping table is a B+ tree, step 503 may also be querying, in the B+ tree, a parent node corresponding to the logical unit identifier according to the logical unit identifier and the snapshot time point, determining whether a leaf node corresponding to the logical unit identifier and the snapshot time point exists in the parent node, and if the leaf node corresponding to the logical unit identifier and the snapshot time point exists in the parent node, determining that mapping entry information corresponding to the leaf node is stored in the leaf node.

504: Read data from a shared storage device according to a storage address included in the mapping entry information.

When the mapping entry information matching the logical unit identifier and snapshot time point of the to-be-read data exists in the shared mapping table, the data is read from the shared storage device according to the storage address included in the matching mapping entry information.

505: Determine whether other mapping entry information corresponding to the logical unit identifier exists in the shared mapping table. If yes, execute step 507; if no, execute step 506.

When the mapping entry information matching the logical unit identifier and snapshot time point of the to-be-read data does not exist in the shared mapping table, it is further determined whether the other mapping entry information corresponding to the logical unit identifier of the to-be-read data exists in the shared mapping table.

In one optional implementation manner of this embodiment, if the shared mapping table is a B+ tree, step 505 may also be querying, in the B+ tree, a parent node corresponding to the logical unit identifier according to the logical unit identifier and the snapshot time point, and when it is determined that a leaf node corresponding to the logical unit identifier and the snapshot time point does not exist in the parent node, further determining whether another leaf node corresponding to the logical unit identifier exists in the parent node.

506: Send the read request to another storage device.

If it is determined that the mapping entry information matching the logical unit identifier and snapshot time point does not exist in the shared mapping table, and it is determined that the other mapping entry information corresponding to the logical unit identifier does not exist in the shared mapping table either, it is determined that copy-on-write is not performed on data that needs to be read, that is, the data that needs to be read is current data that is in a logical unit corresponding to the logical unit identifier and stored in the other storage device.

The read request is sent to the other storage device, so that the other storage device reads corresponding data from the corresponding logical unit according to the logical unit identifier included in the read request.

507: Determine whether mapping entry information with a snapshot time point greater than the snapshot time point of the to-be-read data exists in the other mapping entry information. If yes, execute step 508; if no, execute step 506.

Snapshot time points included in the other mapping entry information are compared with the snapshot time point included in the read request. If it is determined that all the snapshot time points included in the other mapping entry information are less than the snapshot time point included in the read request, it is determined that the data that needs to be read is not copy-on-write data, that is, the data that needs to be read is current data that is in the logical unit corresponding to the logical unit identifier and stored in the other storage device. For example, if copy-on-write is performed on a first logical unit at a snapshot time point 0 and a snapshot time point 1 and a logical unit identifier and a snapshot time point that are included in the read request are 1 and 2 respectively, that is, the data that needs to be read in the read request is data of the first logical unit at the snapshot time point 2. Although the copy-on-write is performed on the first logical unit at the snapshot time point 1, data stored in the first logical unit has been modified after the snapshot time point 1. In addition, the copy-on-write is not performed on the first logical unit at the snapshot time point 2. Therefore, the to-be-read data is determined to be current data stored in the first logical unit, and the read request is sent to the other storage device, so that the other storage device reads corresponding data from a corresponding logical unit according to the logical unit identifier included in the read request.

508: Determine mapping entry information, which is corresponding to the first snapshot time point greater than the snapshot time point included in the read request and is in the other mapping entry information, as mapping entry information of the to-be-read data, and read data from the shared storage device according to a storage address included in the determined mapping entry information of the to-be-read data.

The snapshot time points included in the other mapping entry information are compared with the snapshot time point included in the read request; when mapping entry information with a snapshot time point greater than the snapshot time point of the to-be-read data exists in the other mapping entry information, the mapping entry information, which is corresponding to the first snapshot time point greater than the snapshot time point of the to-be-read data and is in the other mapping entry information, is determined as the mapping entry information of the to-be-read data, and the data is read from the shared storage device according to the storage address included in the determined mapping entry information of the to-be-read data.

For example, if the copy-on-write is performed on the first logical unit at the snapshot time point 2, that is, before the snapshot time point 2, the copy-on-write is performed on data stored in the first logical unit, and after the snapshot time point 2, the data stored in the first logical unit is updated, for example, after the snapshot time point 2, new data is written into the first logical unit. If the copy-on-write is performed on the first logical unit at a snapshot time point 3, before the snapshot time point 3, the copy-on-write is performed on the data (namely, the new data written into the first logical unit after the snapshot time point 2) stored in the first logical unit. If the logical unit identifier of the to-be-read data is 1, and the snapshot time point of the to-be-read data is 1, that is, the to-be-read data is data of the first logical unit at the snapshot time point 1, it may be discovered according to the shared mapping table that the copy-on-write is not performed on the first logical unit at the snapshot time point 1, and the copy-on-write is performed on the first logical unit at the snapshot time point 2 and the snapshot time point 3; then data of the first logical unit at the snapshot time point 2 may be read because the data has just been updated for the first logical unit at the snapshot time point 2. Therefore, the data stored in the first logical unit at the snapshot time point 1 is the same as data of the first logical unit when the copy-on-write is performed at the snapshot time point 2. In other words, at the snapshot time point 1, the first logical unit shares its snapshot data at the snapshot time point 2.

Mapping entry information that is of all copy-on-write data and generated by writing a same production volume is stored in the shared mapping table used in this embodiment of the present invention. Therefore, when multiple pieces of mapping entry information are searched for in the shared mapping table, the shared mapping table needs to be traversed only for one time to acquire the multiple pieces of mapping entry information, so that data corresponding to each storage address may be acquired and related snapshot data processing may be performed according to a storage address included in each piece of the mapping entry information, thereby improving efficiency of reading snapshot data.

Figure 6:
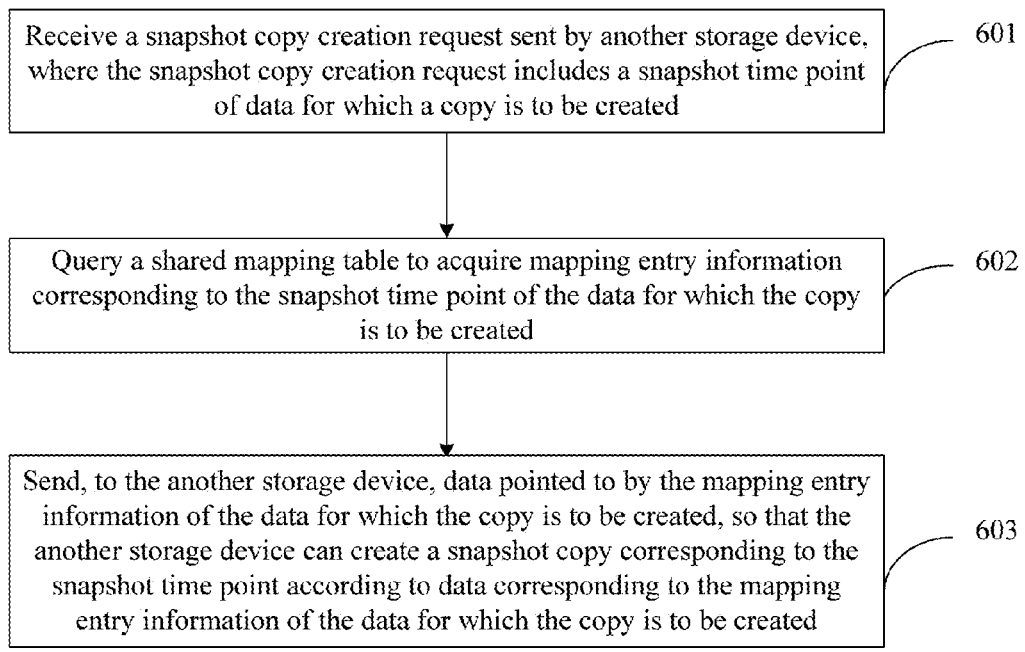
FIG. 6 is a schematic flowchart of a data processing method according to another embodiment of the present invention.

FIG. 6 is a schematic flowchart of a data processing method according to another embodiment of the present invention. As shown in FIG. 6, the method includes the following steps.

601: Receive a snapshot copy creation request sent by another storage device, where the snapshot copy creation request includes a snapshot time point of data for which a copy is to be created.

For example, any network entity that needs to create a snapshot copy may send a snapshot copy creation request to a shared storage device, where the snapshot copy creation request includes at least one snapshot time point.

602: Query a shared mapping table to acquire mapping entry information corresponding to the snapshot time point of the data for which the copy is to be created.

The shared mapping table in this embodiment may be the shared mapping table described in the foregoing embodiment. For detailed content, reference is made to related description in the foregoing embodiment, and details are not repeatedly described herein.

603: Send, to the other storage device, data pointed to by the mapping entry information of the data for which the copy is to be created, so that the other storage device can create a snapshot copy corresponding to the snapshot time point according to data corresponding to the mapping entry information of the data for which the copy is to be created.

In this embodiment, the shared mapping table needs to be traversed only for one time to acquire the mapping entry information corresponding to the snapshot time point of the data for which the snapshot copy is to be created, so as to send, to the other storage device, the data pointed to by the mapping entry information, so that the other storage device can create the corresponding snapshot copy, thereby improving efficiency of snapshot copy creation.

Figure 7:
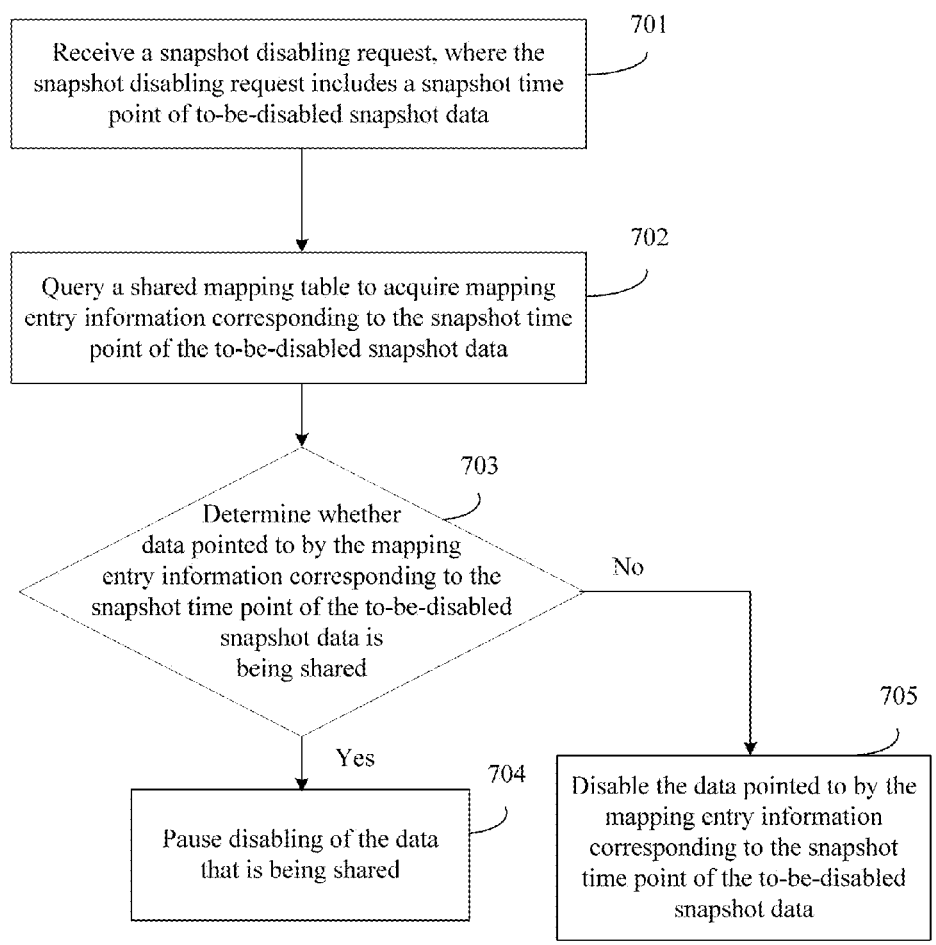
FIG. 7 is a schematic flowchart of a data processing method according to another embodiment of the present invention.

FIG. 7 is a schematic flowchart of a data processing method according to another embodiment of the present invention. As shown in FIG. 7, the method includes the following steps.

701: Receive a snapshot disabling request, where the snapshot disabling request includes a snapshot time point of to-be-disabled snapshot data.

702: Query a shared mapping table to acquire mapping entry information corresponding to the snapshot time point of the to-be-disabled snapshot data.

703: Determine whether data pointed to by the mapping entry information corresponding to the snapshot time point of the to-be-disabled snapshot data is being shared. If yes, execute step 704; if no, execute step 705.

704: Pause disabling of the data that is being shared. That is, wait until the sharing is complete and then disable the data that is being shared.

705: Disable the data pointed to by the mapping entry information corresponding to the snapshot time point of the to-be-disabled snapshot data.

In one optional implementation manner of this embodiment, in the foregoing step 703, the determining whether data pointed to by the mapping entry information corresponding to the snapshot time point of the to-be-disabled snapshot data is being shared includes querying the shared mapping table, and determining whether mapping entry information with a snapshot time point less than the snapshot time point of the to-be-disabled snapshot data exists; and if the mapping entry information with a snapshot time point less than the snapshot time point of the to-be-disabled snapshot data exists, determining that the data pointed to by the mapping entry information corresponding to the snapshot time point of the to-be-disabled snapshot data is not shared.

Figure 8:
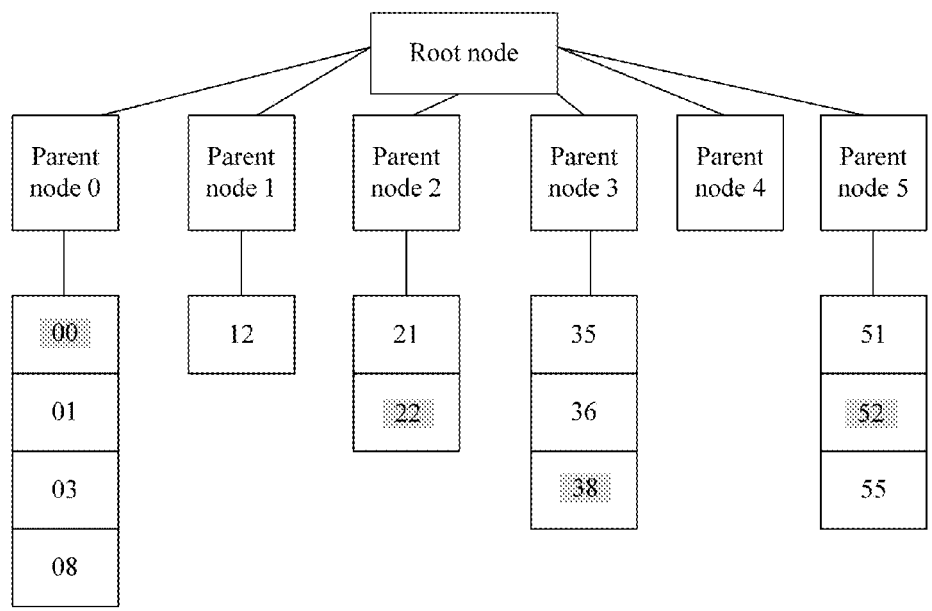
FIG. 8 is a schematic diagram of a shared tree applied to the embodiment shown in FIG. 7.

For example, FIG. 8 is a schematic diagram of a shared tree applied to the embodiment shown in FIG. 7. As shown in FIG. 8, the shared tree has 13 leaf nodes in total, where logical unit identifiers and snapshot time points corresponding to the 13 leaf nodes are 00, 01, 03, 08, 12, 21, 22, 35, 36, 38, 51, 52 and 55, that is, the 13 leaf nodes separately store corresponding mapping entry information. Assuming that snapshot data corresponding to a snapshot time point 1, a snapshot time point 3 and a snapshot time point 6 is snapshot data that is being used, and assuming that snapshot data corresponding to a snapshot time point 0, a snapshot time point 2, a snapshot time point 4, a snapshot time point 5, a snapshot time point 7 and a snapshot time point 8 needs to be disabled (deleted), it needs to be separately determined whether the snapshot data corresponding to the snapshot time point 0, the snapshot time point 2, the snapshot time point 4, the snapshot time point 5, the snapshot time point 7 and the snapshot time point 8 is being shared by snapshots that are being used (snapshots corresponding to the snapshot time point 1, the snapshot time point 3 and the snapshot time point 6).

As shown in FIG. 8, copy-on-write is not performed on data of a logical unit 1 at the snapshot time point 1; therefore, a corresponding leaf node 11 does not exist in the shard mapping table. The copy-on-write is performed on data of the logical unit 1 at the snapshot time point 2; therefore, a leaf node 12 exists in the shard mapping table. It can be known, from the foregoing, that copy-on-write data of the logical unit 1 at the snapshot time point 2 is being shared by the logical unit 1 at the snapshot time point 1, and a snapshot corresponding to the snapshot time point 1 is the snapshot that is being used. Therefore, mapping entry information corresponding to the leaf node 12 and data pointed to by the mapping entry information cannot be deleted.

As shown in FIG. 8, the copy-on-write is not performed on data of a logical unit 3 at the snapshot time point 3; therefore, a corresponding leaf node 33 does not exist in the shard mapping table. The copy-on-write is performed on data of the logical unit 3 at the snapshot time point 5; therefore, a leaf node 35 exists in the shard mapping table. It can be known, from the foregoing, that copy-on-write data of the logical unit 3 at the snapshot time point 5 is being shared by the logical unit 3 at the snapshot time point 3, and a snapshot corresponding to the snapshot time point 3 is the snapshot that is being used. Therefore, mapping entry information corresponding to the leaf node 35 and data pointed to by the mapping entry information cannot be deleted.

As shown in FIG. 8, the copy-on-write is not performed on data of a logical unit 5 at the snapshot time point 3; therefore, a corresponding leaf node 53 does not exist in the shard mapping table. The copy-on-write is performed on data of the logical unit 5 at the snapshot time point 5; therefore, a leaf node 55 exists in the shard mapping table. It can be known, from the foregoing, that copy-on-write data of the logical unit 5 at the snapshot time point 5 is being shared by the logical unit 5 at the snapshot time point 3, and a snapshot corresponding to the snapshot time point 3 is the snapshot that is being used. Therefore, mapping entry information corresponding to the leaf node 55 and data pointed to by the mapping entry information cannot be deleted.

As shown in FIG. 8, the copy-on-write is not performed on data of a logical unit 0 at the snapshot time point 6; therefore, a corresponding leaf node 06 does not exist in the shard mapping table. The copy-on-write is performed on data of the logical unit 0 at the snapshot time point 8; therefore, a leaf node 08 exists in the shard mapping table. It can be known, from the foregoing, that copy-on-write data of the logical unit 0 at the snapshot time point 8 is being shared by the logical unit 0 at the snapshot time point 6, and a snapshot corresponding to the snapshot time point 6 is the snapshot that is being used. Therefore, mapping entry information corresponding to the leaf node 08 and data pointed to by the mapping entry information cannot be deleted.

As shown in FIG. 8, the copy-on-write is performed on the data of the logical unit 0 both at the snapshot time point 0 and the snapshot time point 1; therefore, corresponding leaf nodes 00 and 01 exist in the shared mapping table. It can be known, from the foregoing, that copy-on-write data of the logical unit 0 at the snapshot time point 0 is not shared by the logical unit 0 at the snapshot time point 1, and snapshot data corresponding to the snapshot time point 0 is the snapshot data that needs to be disabled. Therefore, mapping entry information corresponding to the leaf node 00 and data pointed to by the mapping entry information can be deleted.

As shown in FIG. 8, the copy-on-write is performed on the data of a logical unit 2 both at the snapshot time point 1 and the snapshot time point 2; therefore, corresponding leaf nodes 21 and 22 exist in the shared mapping table. It can be known, from the foregoing, that copy-on-write data of the logical unit 2 at the snapshot time point 2 is not shared by the logical unit 2 at the snapshot time point 1, and snapshot data corresponding to the snapshot time point 2 is the snapshot data that needs to be disabled. Therefore, mapping entry information corresponding to the leaf node 22 and data pointed to by the mapping entry information can be deleted.

As shown in FIG. 8, the copy-on-write is performed on the data of the logical unit 3 both at the snapshot time point 6 and the snapshot time point 8; therefore, corresponding leaf nodes 36 and 38 exist in the shared mapping table. It can be known, from the foregoing, that copy-on-write data of the logical unit 3 at the snapshot time point 8 is not shared by the logical unit 3 at the snapshot time point 6, and snapshot data corresponding to the snapshot time point 8 is the snapshot data that needs to be disabled. Therefore, mapping entry information corresponding to the leaf node 38 and data pointed to by the mapping entry information can be deleted.

As shown in FIG. 8, the copy-on-write is performed on the data of the logical unit 5 both at the snapshot time point 1 and the snapshot time point 2; therefore, corresponding leaf nodes 51 and 52 exist in the shared mapping table. It can be known, from the foregoing, that copy-on-write data of the logical unit 5 at the snapshot time point 2 is not shared by the logical unit 5 at the snapshot time point 1, and snapshot data corresponding to the snapshot time point 2 is the snapshot data that needs to be disabled. Therefore, mapping entry information corresponding to the leaf node 52 and data pointed to by the mapping entry information can be deleted.

In one optional implementation manner of this embodiment, in specific implementation, the determining whether data pointed to by the mapping entry information corresponding to the snapshot time point of the to-be-disabled snapshot data is being shared includes separately determining whether the mapping entry information corresponding to the snapshot time point of the to-be-disabled snapshot data is being shared and whether copy-on-write data pointed to by the mapping entry information corresponding to the snapshot time point of the to-be-disabled snapshot data is being used; if the mapping entry information corresponding to the snapshot time point of the to-be-disabled snapshot data is being shared and the copy-on-write data pointed to by the mapping entry information corresponding to the snapshot time point of the to-be-disabled snapshot data is being used, determining that the data pointed to by the mapping entry information corresponding to the snapshot time point of the to-be-disabled snapshot data is being shared.

In this embodiment, the shared mapping table needs to be traversed only for one time to acquire the mapping entry information corresponding to the snapshot time point of the to-be-disabled snapshot data, so that the data pointed to by the mapping entry information can be disabled, thereby improving efficiency of disabling snapshot data.

It should be noted that, the shared mapping table described in this embodiment of the present invention may also be used for a snapshot data processing service, such as a snapshot rollback, remote replication of a production volume, and copying of a production volume. Mapping entry information that is of all copy-on-write data and generated by writing a same production volume is stored in the shared mapping table used in this embodiment of the present invention. Therefore, when multiple pieces of mapping entry information are searched for in the shared mapping table, the shared mapping table needs to be traversed only for one time to acquire the multiple pieces of mapping entry information, so that data corresponding to each storage address may be acquired and related snapshot data processing may be performed according to a storage address included in each piece of the mapping entry information, thereby improving efficiency of snapshot data processing.

Figure 9:
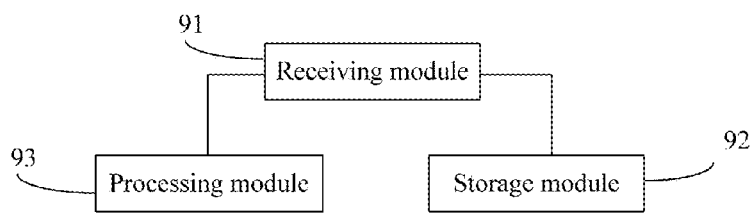
FIG. 9 is a schematic structural diagram of a data processing apparatus according to an embodiment of the present invention.

FIG. 9 is a schematic structural diagram of a data processing apparatus according to an embodiment of the present invention, where the apparatus includes a receiving module 91 configured to receive a copy-on-write request sent by another storage device, where the copy-on-write request includes data on which copy-on-write is to be performed and a logical unit identifier and snapshot time point of the data; a storage module 92 configured to store the data on which the copy-on-write is to be performed and that is included in the copy-on-write request received by the receiving module 91; and a processing module 93 configured to search, according to the logical unit identifier and snapshot time point of the data that are included in the copy-on-write request received by the receiving module 91, a preset shared mapping table for a corresponding entry, and store, in the corresponding entry, mapping entry information of the data, where the mapping entry information includes the logical unit identifier and snapshot time point of the data and a storage address that is of the data and in a shared storage device.

In one optional implementation manner of the embodiment, a representation form of the shared mapping table includes a shared tree, where the shared tree includes one root node, the root node includes at least one parent node, each parent node corresponds to one logical unit, and each parent node includes a logical unit identifier of data on which copy-on-write is to be performed; and a parent node may include at least one leaf node, and each leaf node includes mapping entry information of data on which the copy-on-write has been performed. Based on the foregoing shared tree, the processing module 93 is configured to query the shared tree according to the logical unit identifier of the data; determine a parent node corresponding to the logical unit identifier; determine, according to the logical unit identifier and snapshot time point of the data and in the determined parent node, a leaf node corresponding to the logical unit identifier and the snapshot time point; and store, in the corresponding leaf node, the mapping entry information of the data.

Figure 10:
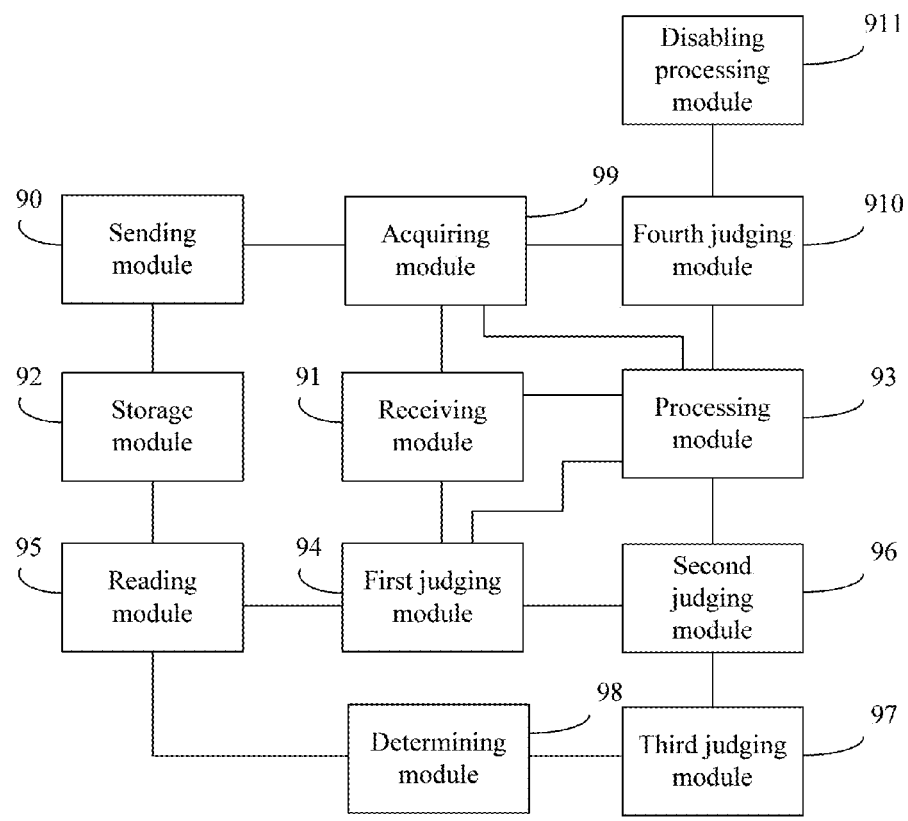
FIG. 10 is a schematic structural diagram of another data processing apparatus according to an embodiment of the present invention.

FIG. 10 is a schematic structural diagram of another data processing apparatus according to an embodiment of the present invention. As shown in FIG. 10, this apparatus is based on the apparatus shown in FIG. 9, and the receiving module 91 is further configured to receive a read request, where the read request includes a logical unit identifier and snapshot time point of to-be-read data; and the data processing apparatus further includes a first judging module 94 configured to query the shared mapping table according to the read request received by the receiving module 91, and determine whether mapping entry information matching the logical unit identifier and snapshot time point of the to-be-read data exists in the shared mapping table; a reading module 95 configured to, when the first judging module 94 determines that the mapping entry information matching the logical unit identifier and snapshot time point of the to-be-read data exists in the shared mapping table, read data from the shared storage device according to a storage address included in the matching mapping entry information; a second judging module 96 configured to, when the first judging module 94 determines that the mapping entry information matching the logical unit identifier and snapshot time point of the to-be-read data does not exist in the shared mapping table, determine whether other mapping entry information corresponding to the logical unit identifier of the to-be-read data exists in the shared mapping table; a third judging module 97 configured to, when the second judging module 96 determines that the other mapping entry information corresponding to the logical unit identifier of the to-be-read data exists in the shared mapping table, determine whether mapping entry information with a snapshot time point greater than the snapshot time point of the to-be-read data exists in the other mapping entry information; and a determining module 98 configured to, when the third judging module 97 determines that the mapping entry information with a snapshot time point greater than the snapshot time point of the to-be-read data exists in the other mapping entry information, determine mapping entry information, which is corresponding to the first snapshot time point greater than the snapshot time point of the to-be-read data and in the other mapping entry information, as mapping entry information of the to-be-read data; and the reading module 95 is further configured to read data from the shared storage device according to a storage address included in the mapping entry information that is of the to-be-read data and determined by the determining module 98.

In one optional implementation manner of the present invention, the receiving module 91 is further configured to receive a snapshot copy creation request sent by the other storage device, where the snapshot copy creation request includes a snapshot time point of data for which a copy is to be created; and the data processing apparatus further includes an acquiring module 99 configured to query the shared mapping table according to the snapshot time point received by the receiving module 91, so as to acquire mapping entry information corresponding to the snapshot time point of the data for which the copy is to be created; and a sending module 90 configured to send, to the other storage device according to the mapping entry information that is corresponding to the snapshot time point of the data for which the copy is to be created and acquired by the acquiring module 99, data pointed to by the mapping entry information, so that the other storage device can create a snapshot copy corresponding to the snapshot time point according to the data pointed to by the mapping entry information of the data for which the copy is to be created.

In one optional implementation manner of the present invention, the receiving module 91 is further configured to receive a snapshot disabling request, where the snapshot disabling request includes a snapshot time point of to-be-disabled snapshot data; and the acquiring module 99 is further configured to query the shared mapping table according to the snapshot time point received by the receiving module, so as to acquire mapping entry information corresponding to the snapshot time point of the to-be-disabled snapshot data; and the data processing apparatus further includes a fourth judging module 910 configured to determine, according to the mapping entry information that is corresponding to the snapshot time point of the to-be-disabled snapshot data and is acquired by the acquiring module 99, whether data pointed to by the mapping entry information corresponding to the snapshot time point of the to-be-disabled snapshot data is being shared; and a disabling processing module 911 configured to, when the fourth judging module 910 determines that the data pointed to by the mapping entry information corresponding to the snapshot time point of the to-be-disabled snapshot data is being shared, disable the snapshot data that is being shared after the sharing is complete; and when the fourth judging module 910 determines that the data pointed to by the mapping entry information corresponding to the snapshot time point of the to-be-disabled snapshot data is not being shared, disable the data pointed to by the mapping entry information corresponding to the snapshot time point of the to-be-disabled snapshot data.

The fourth judging module 910 includes a first judging sub-module configured to query the shared mapping table and determine whether mapping entry information with a snapshot time point less than the snapshot time point of the to-be-disabled snapshot data exists; and a shared-data determining sub-module configured to, when the first judging sub-module determines that the mapping entry information with a snapshot time point less than the snapshot time point of the to-be-disabled snapshot data exists, determine that the data pointed to by the mapping entry information corresponding to the snapshot time point of the to-be-disabled snapshot data is not shared.

In this embodiment, the apparatus needs to traverse the shared mapping table only for one time to acquire various mapping entry information and corresponding copy-on-write data that are required for snapshot service processing and to perform a corresponding snapshot service, which can improve efficiency of snapshot data processing.

Figure 11:
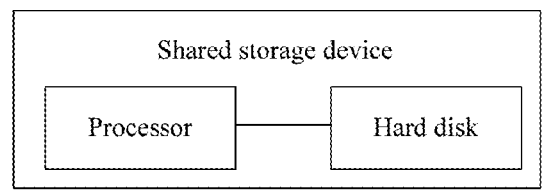
FIG. 11 is a schematic structural diagram of a shared storage device according to an embodiment of the present invention.

FIG. 11 is a schematic structural diagram of a shared storage device according to an embodiment of the present invention. The shared storage device includes one processor and a hard disk. When the processor runs, the following steps are executed: the processor receives a copy-on-write request sent by another storage device, where the copy-on-write request includes data on which copy-on-write is to be performed and a logical unit identifier and snapshot time point of the data; the processor stores, in the hard disk, the data on which the copy-on-write is to be performed; and the processor searches, according to the logical unit identifier and snapshot time point of the data, a preset shared mapping table for a corresponding entry, and stores, in the corresponding entry, mapping entry information of the data, where the mapping entry information includes the logical unit identifier and snapshot time point of the data and a storage address that is of the data and in the shared storage device.

In one optional implementation manner of the prevent invention, when the processor runs, the following steps are further executed: the processor receives a read request, where the read request includes a logical unit identifier and snapshot time point of to-be-read data; the processor queries the shared mapping table, and determines whether mapping entry information matching the logical unit identifier and snapshot time point of the to-be-read data exists in the shared mapping table; and when the mapping entry information matching the logical unit identifier and snapshot time point of the to-be-read data exists in the shared mapping table, the processor reads data from the hard disk according to a storage address included in the matching mapping entry information.

In this embodiment, the shared storage device needs to traverse the shared mapping table only for one time to acquire mapping entry information and corresponding copy-on-write data that are required for snapshot service processing and to perform a corresponding snapshot service, which can improve efficiency of snapshot data processing.

It may be understood that, in an implementation process of the processor in the shared storage device described in this embodiment of the present invention, the data processing methods described in the embodiments in FIG. 5 and FIG. 6 may further be executed. For details, reference may be made to description of the foregoing method embodiments, and details are not repeatedly described herein.

It should be noted that for brief description, the foregoing method embodiments are described as a combination of a series of actions. However, a person skilled in the art should understand that the present invention is not limited by a sequence of the described actions because some steps may be performed in other sequences or simultaneously according to the present invention. In addition, a person skilled in the art should also understand that the embodiments described in the specification all belong to exemplary embodiments, and the involved actions and modules are not necessarily mandatory to the present invention.

In the foregoing embodiments, the description of each embodiment has its emphasis, and for parts which are not described in detail in a certain embodiment, reference may be made to the relevant description of other embodiments.

It may be understood that, the methods described in the foregoing embodiments may be used in combination, and may also be used alone; certainly, the apparatuses described in the foregoing embodiments may also be used in combination or alone, which are not limited herein.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A data processing method comprising:
storing, by a first storage device, a first data and a third data, wherein the first data is data on which a first copy-on-write action is to be performed at a first snapshot point, wherein the third data is data on which a second copy-on-write action is to be performed at a third snapshot point, and wherein the first data is data in a first logical unit of a production volume in a second storage device corresponding to a first logical unit identifier before overwritten by the third data;
receiving, by the first storage device, a first read request for reading a second data, wherein the first read request comprises the first logical unit identifier and a second snapshot time point;
determining, by the first storage device, a copy-on-write action is not to be performed on the second data in the first logical unit at the second snapshot time point and the second data stored in the first logical unit at the second snapshot time point is the same as the third data of the first logical unit when the first logical unit identifier and the second snapshot time point fails to match a mapping entry information item in a mapping table and when the second copy-on-write is performed at the third snapshot time point, wherein the mapping table is used to store mapping entry information for data on which a copy-on-write action needs to be performed and the data is generated by a same production volume, wherein a first entry of the mapping table comprises a first mapping entry information and a second mapping entry information, wherein the first mapping entry information comprises the first logical unit identifier, a first snapshot time point and a first storage address of the first data in the first storage device, wherein the second mapping entry information comprises the first logical unit identifier, the third snapshot time point, and a third storage address of the third data in the first storage device, and wherein the second snapshot time point is later than the first snapshot time point and earlier than the third snapshot time point; and reading, by the first storage device, the third data from the first, storage device according to the third storage address in the second mapping entry information, wherein mapping entry information items with the first logical unit identifier in the mapping table are arranged in ascending order according to their snapshot time points, and wherein the third snapshot time point in the second mapping entry information is an earliest snapshot time point among any snapshot time points of the mapping entry information items in the first entry after the second snapshot time point.

2. The method according to claim 1 further comprising:
receiving, by the first storage device, a second read request for reading the first data, wherein the second read request comprises the first logical unit identifier and the first snapshot time point of the first data; and
reading, by the first storage device, the first data from the first storage device according to the first storage address in the first mapping entry information when the first mapping entry information matches the first logical unit identifier and the first snapshot time point of the first data.

3. The method according to claim 1, further comprising:
receiving, by the first storage device, a snapshot copy creation request from a third storage device for creating a snapshot copy of the third data, wherein the snapshot copy creation request comprises the third snapshot time point of the third data;
acquiring, by the first storage device and from the mapping table, the second mapping entry information corresponding to the third snapshot time point of the third data; and
sending, by the first storage device, the third data pointed to by the second mapping entry information to the third storage device.

4. The method according to claim 1 further comprising:
receiving, by the first storage device, a snapshot disabling request for disabling snapshot data, wherein the snapshot disabling request comprises the first snapshot time point;
acquiring, by the first storage device and from the mapping table, the first mapping entry information corresponding to the first snapshot time point; and
disabling, by the first storage device, the first data pointed to by the first mapping entry information after a sharing is completed when the first data pointed to by the first mapping entry information is being shared,
wherein the first data is shared when a mapping entry information item with the first logical unit identifier and a snapshot time point later than the first snapshot time point exists in the mapping table.

5. The method according to claim 4, wherein the first data pointed to by the first mapping entry information is not shared when a mapping entry information item with the first logical unit identifier and a snapshot time point earlier than the first snapshot time point exists in the mapping table.

6. A storage device comprising:
a first storage device configured to store copy-on-write data from a second storage device; and
a processor coupled to the first storage device and configured to:
store a first data and a third data, wherein the first data is data on which a first copy-on-write action is to be performed at a first snapshot point, wherein the third data is data on which a second copy-on-write action is to be performed at a third snapshot point, and wherein the first data is data in a first logical unit of a production volume in a second storage device corresponding to a first logical unit identifier before overwritten by the third data:
receive a first read request for reading a second data, wherein the first read request comprises the first logical unit identifier and a second snapshot time point; and
determine a copy-on-write action is not to be performed on the second data in the first logical unit at the second snapshot time point and the second data stored in the first logical unit at the second snapshot time point is the same as the third data of the first logical unit when the first logical unit identifier and the second snapshot time point fails to match a mapping entry information item in a mapping table and when the second copy-on-write is performed at the third snapshot time point, wherein the mapping table is used to store mapping entry information for data on which a copy-on-write action needs to be performed and the data is generated by a same production volume, wherein a first entry of the mapping table comprises a first mapping entry information and a second mapping entry information, wherein the first mapping entry information comprises the first logical unit identifier, a first snapshot time point, and a first storage address of the first data in the first storage device, wherein the second mapping entry information comprises the first logical unit identifier, the third snapshot time point, and a third storage address of the third data in the first storage device, and wherein the second snapshot time point is later than the first snapshot time point and earlier than the third snapshot time point; and
read the third data from the first storage device according to the third storage address in the second mapping entry information when, wherein mapping entry information items with the first logical unit identifier in the mapping table are arranged in ascending order according to their snapshot time points, and wherein the third snapshot time point in the second mapping entry information is an earliest snapshot time point among any snapshot, time points of the mapping entry information items in the first entry after a second time point.

7. The storage device according to claim 6, wherein the processor is further configured to:

receive a second read request for reading the first data, wherein the second read request comprises the first logical unit identifier and the first snapshot time point of the first data; and read the first data from the first storage device according to the fir storage address in the first mapping entry information when the first mapping entry information matches the first logical unit identifier and the first snapshot time point of the first data.

8. The storage device according to claim 6, wherein the processor is further configured to:

receive a snapshot copy creation request from a third storage device for creating a snapshot copy of the third data, wherein the snapshot copy creation request comprises the third snapshot time point of the third data;

acquire, from the mapping table, the second mapping entry information corresponding to the third snapshot time point of the third data; and send the third data pointed to by the second mapping entry information to the third storage device.

9. The storage device according to claim 6, wherein the processor is further configured to:

receive a snapshot disabling request for disabling snapshot data, wherein the snapshot disabling request comprises the first snapshot time point;

acquire, from the mapping table, the first mapping entry information corresponding to the first snapshot time point; and disable the first data pointed to by the first mapping entry information after a sharing is completed when the first data pointed to by the first mapping entry information is being shared, wherein the first data is shared when a mapping entry information item with the first logical unit identifier and a snapshot time point later than the first snapshot time point exists in the mapping table.

10. The storage device according to claim 9 wherein the first data pointed to by the first mapping entry information is not shared when a mapping entry information item with the first logical unit identifier and a snapshot time point earlier than the first snapshot time point exists in the mapping table.

11. The method according to claim 1 further comprising:

receiving, by the first storage device, a snapshot disabling request for disabling snapshot data, wherein the snapshot disabling request comprises the first snapshot time point;

acquiring, by the first storage device and from the mapping table, the first mapping entry information corresponding to the first snapshot time point; and disabling, by the first storage device, the first data pointed to by the first mapping entry information when the first data is not being shared.

12. The storage device according to claim 6, wherein the processor is further configured to:

receive a snapshot disabling request for disabling snapshot data, wherein the snapshot disabling request comprises the first snapshot time point;

acquire, from the mapping table, the first mapping entry information corresponding to the first snapshot time point; and disable the first data pointed to by the first mapping entry information when the first data is not being shared.

13. A non-transitory computer-readable storage medium comprising instructions which, when executed by one or more processors of a first storage device, cause the first storage device to carry out:

storing a first data and a third data, wherein the first data is data on which a first copy-on-write action is to be performed at a first, snapshot point' whereto the third data is data on which a second copy-on-write action is to be performed at a third snapshot point, and wherein the first data is data in a first logical unit of a production volume in a second storage device corresponding to a first logical unit identifier before overwritten by the third data;

receiving a first read request for reading a second data, wherein the first read request comprises the first logical unit identifier and a second snapshot time point;

determining a copy-on-write action is not performed on the second data in the first logical unit at the second snapshot time point and the second data stored in the first logical unit at the second snapshot time point is the same as the third data of the first logical unit when the first logical unit identifier and the second snapshot time point fails to match a mapping entry information item in a mapping table and when the second copy-on-write is performed at the third snapshot, time point, wherein the mapping table is used to store mapping entry information for data on which a copy-on-write action needs to be performed and the data is generated by a same production volume, wherein a first entry of the mapping table comprises a first mapping entry information and a second mapping entry information, wherein the first mapping entry information comprises the first logical unit identifier, a first snapshot lime point, and a first storage address of the first data in the first storage device, wherein the second mapping entry information comprises the first logical unit identifier, the third snapshot time point, and a third storage address of the third data in the first storage device, and wherein the second snapshot time point is later than the first snapshot time point and earlier than the third snapshot time point; and reading the third data from the first storage device according to the third storage address in the second mapping entry information, wherein mapping entry information items with the first logical unit identifier in the mapping table are arranged in ascending order according to their snapshot time points, and wherein the third snapshot time point in the second mapping entry information is an earliest snapshot time point among any snapshot time points of the mapping entry information items in the first entry after the second snapshot time point.

14. The non-transitory computer-readable storage medium according to claim 13, further comprising instructions which, when executed by the first storage device, cause the first storage device to carry out:

receiving a second read request for reading the first data, wherein the second read request comprises the first logical unit identifier and the first snapshot time point of the first data; and reading the first data from the first storage device according to the first storage address in the first mapping entry information when the first mapping entry information matches the first logical unit identifier and the first snapshot time point of the first data.

15. The non-transitory computer-readable storage medium according to claim 13, further comprising instructions which, when executed by the first storage device, cause the first storage device to carry out:

receiving a snapshot copy creation request from a third storage device for creating a snapshot copy of the third data, wherein the snapshot copy creation request comprises the third snapshot time point of the third data;
acquiring, from the mapping table, the second mapping entry information corresponding to the third snapshot time point of the third data; and
sending the third data pointed to by the second mapping entry information to the third storage device.

16. The non-transitory computer-readable storage medium according to claim 13, further comprising instructions which, when executed by the first storage device, cause the first storage device to carry out:
receiving a snapshot disabling request for disabling snapshot data, wherein the snapshot disabling request comprises the first snapshot time point;
acquiring, from the mapping table, the first mapping entry information corresponding to the first snapshot time point; and
disabling the first data pointed to by the first mapping entry information after a sharing is completed when the first data pointed to by the first mapping entry information is being shared, wherein the first data is being shared when a mapping entry information item with the first logical unit identifier and a snapshot time point later than the first snapshot time point exists in the mapping table.

17. The non-transitory computer-readable storage medium according to claim 13, further comprising instructions which, when executed by the first storage device, cause the first storage device to carry out:
receiving a snapshot disabling request for disabling snapshot data, wherein the snapshot disabling request comprises the first snapshot time point;
acquiring, from the mapping table, the first mapping entry information corresponding to the first snapshot time point; and
disabling the first data pointed to by the first mapping entry information when the first data is not being shared,
wherein the first data is not shared when a mapping entry information item with the first logical unit identifier and a snapshot time point earlier than the first snapshot time point exists in the mapping table.

18. The method according to claim 1, further comprising:
receiving, by the first storage device, a first copy-on-write request from the second storage device, wherein the first copy-on-write request comprises the first data on which the first copy-on-write action is to be performed, the first logical unit identifier of the first logical unit, and the first snapshot time point;
storing, by the first storage device, the first data into the first storage device;
storing, by the first storage device according to the first logical unit identifier and the first snapshot time point of the first data, the first mapping entry information of the first data in a first corresponding entry of the mapping table,
wherein the first mapping entry information comprises the first logical unit identifier, the first snapshot time point of the first data, and the first storage address of the first data in the first storage device.

19. The storage device according to claim 6, wherein the processor is further configured to:
receive a snapshot disabling request for disabling snapshot data, wherein the snapshot disabling request comprises the first snapshot time point;
acquire, from the mapping table, the first mapping entry information corresponding to the first snapshot time point; and
disable the first data pointed to by the first mapping entry information after a sharing is completed when the first data pointed to by the first mapping entry information is being shared,
wherein the first data is shared when a mapping entry information item with the first logical unit identifier and a snapshot time point later than the first snapshot time point exists in the mapping table.

20. The method according to claim 18, wherein a representation form of the mapping table comprises a shared tree, wherein the method further comprises searching a corresponding leaf node in the shared tree according to key value information formed by the first logical unit identifier and the first snapshot time point of the first data, and wherein the first mapping entry information of the first data is stored in a searched leaf node.

21. The storage device according to claim 19, wherein a representation form of the mapping table comprises a shared tree, wherein when searching the mapping table, the processor is further configured to search a corresponding leaf node in the shared tree according to key value information formed by the first logical unit identifier and the first snapshot time point of the first data, and wherein the first mapping entry information of the first data is stored in a searched leaf node.

* * * * *

UNITED STATES PATENT AND TRADEMARK OFFICE
CERTIFICATE OF CORRECTION

PATENT NO. : 9,952,783 B2
APPLICATION NO. : 14/599673
DATED : April 24, 2018
INVENTOR(S) : Cheng Lu, Bin Yang and Ye Zou Page 1 of 1

It is certified that error appears in the above-identified patent and that said Letters Patent is hereby corrected as shown below:

Column 21; Line 6; Claim 7 should read:
to the first storage address in the first mapping entry Signed and Sealed this
Twelfth Day of June, 2018

Andrei Iancu
*Director of the United States Patent and Trademark Office*